(12) United States Patent
Moliski

(10) Patent No.: US 6,737,140 B2
(45) Date of Patent: May 18, 2004

(54) WEB OF RECORD MEMBERS

(75) Inventor: John W. Moliski, Sayre, PA (US)

(73) Assignee: Paxar Corporation, White Plains, NY (US)

( * ) Notice: Subject to any disclaimer, the term of this patent is extended or adjusted under 35 U.S.C. 154(b) by 79 days.

(21) Appl. No.: 09/822,935

(22) Filed: Mar. 30, 2001

(65) Prior Publication Data

US 2002/0142122 A1 Oct. 3, 2002

(51) Int. Cl.[7] .................................................. G09F 3/10
(52) U.S. Cl. ........................... 428/43; 283/81; 283/105; 428/40.1; 428/41.8; 428/42.2; 428/42.3
(58) Field of Search .............................. 428/40.1, 42.2, 428/42.3, 43, 41.8; 283/81.05

(56) References Cited

U.S. PATENT DOCUMENTS

| | | |
|---|---|---|
| 3,963,124 A | 6/1976 | Banks |
| 4,188,250 A | 2/1980 | Grass |
| 4,309,468 A | 1/1982 | Aubin |
| RE30,958 E | 6/1982 | White |
| 5,833,273 A * | 11/1998 | Strenk .......................... 283/67 |

* cited by examiner

Primary Examiner—Nasser Ahmad
(74) Attorney, Agent, or Firm—Joseph J. Grass

(57) ABSTRACT

There is disclosed a web of record assemblies, wherein each record assembly includes a single-ply tag and a single-ply adhesive-backed label. The pressure sensitive adhesive on the label is releasably adhered to a release liner which underlies the label. The tag is detachable from the label is releasably from the liner. The label is preferably connected to the matrix which surrounds the label.

5 Claims, 1 Drawing Sheet

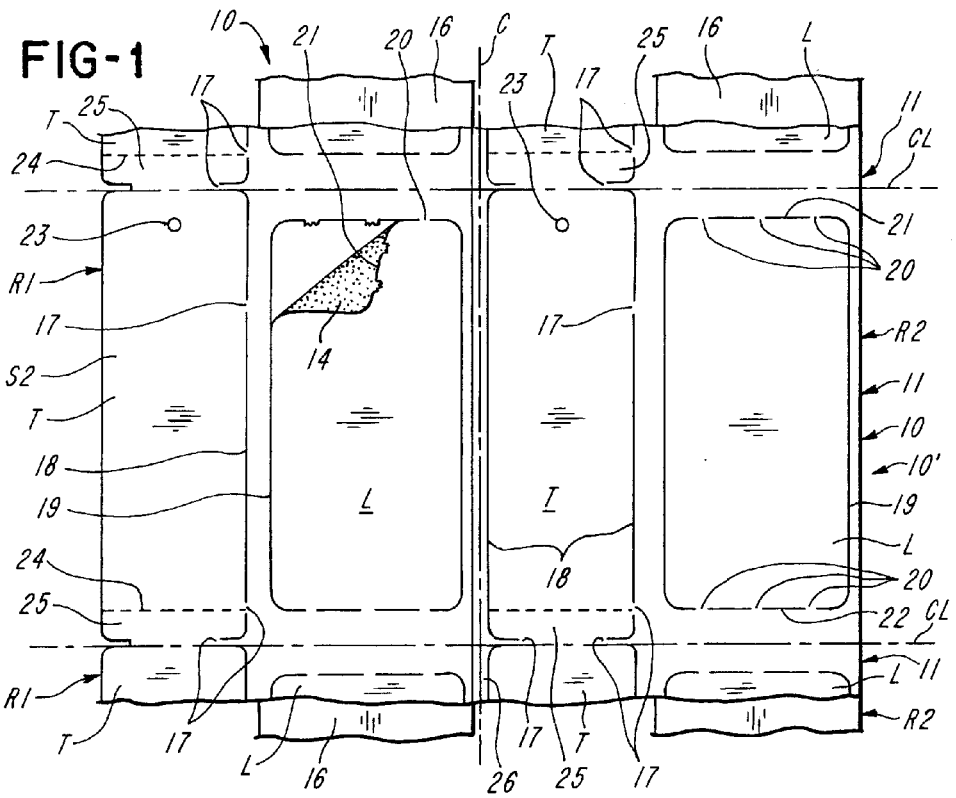
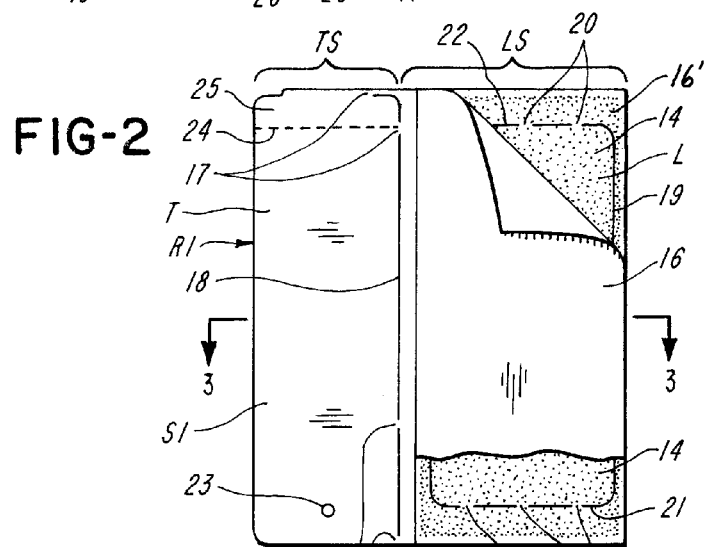
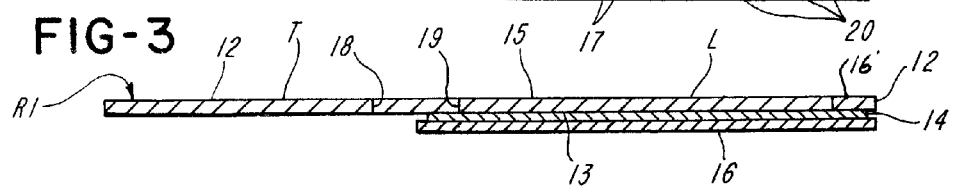

WEB OF RECORD MEMBERS

BACKGROUND OF THE INVENTION

1. Field of the Invention

This invention relates to webs of record members.

2. Brief Description of the Prior Art

The following U.S. patents are made of record: U.S. Pat. Nos. 3,963,124; 4,188,250; 4,309,468; and 5,833,273.

SUMMARY OF THE INVENTION

The purpose of the invention is to provide an improved web of record members comprising garment tags and labels, wherein the tags are free of adhesive and the labels can be removed and applied to a desired surface, wherein a standard release liner is used, and wherein both the tags and the labels are of one-piece or single-ply construction. According to the invention, it is desired that the tag be of one-piece or single-ply construction so that no adhesive can bleed onto the garment during steaming to which the garment and the tag are customarily subjected. Such single-ply tags are less susceptible to becoming dog-eared during repeated handling compared to laminated tags. In addition, single-ply tags are less susceptible to delamination or fraying and provide for a better appearance than a laminated tag.

It is another feature of the invention to provide an improved web of record members, wherein the web includes a series of connected record assemblies, with each assembly including a single-ply tag and a single-ply label, which can be fed through and printed upon by a printer, and wherein the tag stock of which the tags and the labels are constructed is of uniform thickness.

According to a specific embodiment of the invention, there is provided a longitudinally extending web of tag stock, the tag stock having an upper printable face and a lower printable face, longitudinally extending, spaced-apart strips of pressure sensitive adhesive on the lower face, longitudinally extending, spaced apart webs of liner having a continuous release coating releasably adhered to the pressure sensitive adhesive, the tag stock including side-by-side tag and label sections in a transversely alternating pattern, the label sections having the pressure sensitive adhesive and the tag sections being free of adhesive, the tag sections being partially severed from the tag stock to provide a series of detachable generally rectangular tags, and the label sections being cut by a continuous or substantially continuous cut or severing to provide a series of generally rectangular labels releasably adhered to the liner. The wide web is slit longitudinally between adjacent pairs of tags and labels, to provide a plurality of narrow webs. If desired, a narrow web of record members can be made by providing narrow tag stock in which case there is only one record assembly transversely across the web.

BRIEF DESCRIPTION OF THE DIAGRAMMATIC DRAWINGS

FIG. 1 is a top plan view of a wide web of record members in accordance with the invention;

FIG. 2 is a partly broken-away bottom plan view of a record member assembly including a tag and a label; and FIG. 3 is a sectional view taken along line 3—3 of FIG. 2.

DETAILED DESCRIPTION OF THE PREFERRED EMBODIMENTS

With reference to FIG. 1, there is shown a wide longitudinally extending web 10', comprising connected webs 10. The webs 10' is subsequently slit apart along line C to provide narrow webs 10 of record assemblies 11 adapted to be wound into a roll for printing in a printer as shown for example in U.S. Pat. No. 5,788,384. The web 10'0 includes a single longitudinally extending web of tag stock 12. The tag stock 12 has a lower face 13, a patterned coating of longitudinally extending transversely spaced stripes of pressure sensitive adhesive 14 and an upper surface or face 15 which preferably has a thermal coating for printing in a thermal printer as in U.S. Pat. No. 5,788,384. Preferably a plurality of transversely spaced release liners 16 having a continuous silicone release coating are adhered to the underside of the adhesive 14. The release liner arrangement is comprised of a release liner 16 for each record assembly R1, R2, and so on. The liners 16 are transversely or laterally spaced across the web 10 as shown. The liner 16 preferably terminates short of the tag T or tag section TS as shown in FIG. 3 for example. The liners 16 have a known silicone release coating on one surface to which the labels L are releasably adhered by the pressure sensitive adhesive 14. As shown in FIG. 2, adhesive 14 preferably terminates short of the leading and trailing edges of the record assemblies R1 and R2 to avoid gumming of the cut-off knife when cuts are made along line CL.

The web 10' is shown to comprise a series of connected record assemblies R1 and R2. Although two record assemblies are illustrated, any practical number of record assemblies transversely across the web 10' can be provided, for example, a single record assembly R1, two record assemblies R1 and R2 as illustrated, or three or more record assemblies. The web 10' can be completely severed longitudinally along a centerline C in production, so that the resultant web is one record assembly wide. Each record assembly R1 and R2 has a tag section TS including a tag T and a label section LS including a label L. As shown, each tag T and label L is elongate and is generally rectangular in shape. There is a matrix or unused part 16' of the tag stock 12 to one side of the tag T and completely surrounding the label L. The tag T is releasably adhered by ticks or uncut lands 17 to the matrix 16'. The leading and trailing ends of the tags T are also connected to adjacent tags T until cut apart along line CL. The remainder of the tag T is completely severed from the matrix 16' along a line 18. The liner 16 is uncut at the line 19. The label L is completely severed from the matrix 16' along a line 19 except preferably for frangible ticks or uncut lands 20 at the leading edges 21 and at the trailing edges 22 of each label L. The lands 20 keep the label L in the plane of the matrix 16' during both production of the web 10' and during use of the web 10 on a printer. It is preferred to use such lands 20 especially in the event the labels L are relatively stiff.

The tags T are each provided with an attacher hole 23 which can receive a plastic fastener of the type sold by Monarch Marking Systems, Inc., now by change of name, Paxar Americas, Inc., Dayton, Ohio USA under the trademark TAGGER TAIL®. The tags T are also provided with a transverse line of partial severing or perforations 24 close to one end of the tag T to provide a price tab 25 which can be torn from the reminder of the tag T.

FIG. 2 shows one of the record assemblies, for example the record assembly R1 after it has been printed and subsequently cut from the web 10'. The one side S1 of the tag is pre-printed, preferably by the flexographic printing process and preferably with a high quality image such as a store or brand name. The pre-printing is done when the web is being manufactured. Side S2 of the entire tag stock 12 has a thermal coating so that the tag T and the label L of one record assembly R1 can be printed substantially simultaneously in a single pass of the narrow web 10 of record members R1, for example, through the printer. Immediately downstream of the printing station of the printer, the just printed record assembly is severed along transverse line of compete severing indicated at CL. The result is a record assembly such as the record assembly R1 shown in FIG. 2. The severed record assembly R1 can now be hung onto the garment using a plastic fastener. As the garment and record assembly R1 are processed by steaming the garment, the record assembly R1 is also subjected to steaming. In that the tag T is a single-ply tag, that is, one layer or ply rather than two or more layers or plies of adhesively adhered paper, the propensity to delaminate or for the adhesive to ooze out onto the garment is avoided. Also, a single-ply tag is less likely to dog-ear as with a laminated tag.

The narrow strip 26 of tag stock 12 between the line C and the left edges of the tags T in FIG. 1 can be trimmed off.

By way of example, not limitation, the tag stock 12 can be as thin as 0.007 inch thick or thinner, or it can be thicker such as 0.012 inch thick or thicker, or of a thickness therebetween, and the liner is between about 0.002 and 0.003 inch thick.

Other embodiments and modifications of the invention will suggest themselves to those skilled in the art, and all such of these as come within the spirit of this invention are included within its scope as best defined by the appended claims.

What is claimed is:

1. A web of record members, comprising: a longitudinally extending web of single-ply tag stock, the tag stock including side-by-side pairs of tag and label sections, the tag sections and the label sections being generally rectangular with the longer dimensions extending longitudinally, the tag stock having an upper face and a lower face, a longitudinally extending stripe of pressure sensitive adhesive on the lower face of only the label sections, a longitudinally extending web of liner having a release coating releasably adhered to the pressure sensitive adhesive, the tag sections being free of adhesive, wherein the lower faces of the tag sections of the tag stock are pre-printed, the tag sections being partially severed from the tag stock to provide a series of detachably connected single-ply tags, the label sections having a cut line in the tag stock to provide a series of single-ply labels releasably adhered to the liner, a matrix surrounding each label for spacing the tag section and the label of each pair laterally apart and for spacing the labels longitudinally apart, and the liner being at least as wide as the width of the adhesive stripe but narrower than the width of the tag stock.

2. A web of record members as defined in claim 1, wherein at least a leading end of each label is detachably connected by at least one land to the remainder of the tag stock.

3. A web of record members as defined in claim 1, wherein both the leading and trailing ends of each label are detachably connected by at least one land to the remainder of the tag stock.

4. A web of record members as defined in claim 1, wherein the liner terminates short of the tag sections.

5. A web of record members as defined in claim 1, wherein the adhesive terminates short of the leading and trailing edges of the label sections.

* * * * *

UNITED STATES PATENT AND TRADEMARK OFFICE
CERTIFICATE OF CORRECTION

PATENT NO. : 6,737,140 B2  Page 1 of 1
DATED : May 18, 2004
INVENTOR(S) : John W. Moliski It is certified that error appears in the above-identified patent and that said Letters Patent is hereby corrected as shown below:

<u>Title page,</u>
Item [57], ABSTRACT,
Line 5, after "label" and before "is" insert -- and the label --.
Line 6, delete "releasably" and insert -- releasable --.
Line 6, after "preferably" and before "connected" insert -- detachably --.

Signed and Sealed this

Second Day of November, 2004

JON W. DUDAS
*Director of the United States Patent and Trademark Office*